United States Patent Office 3,515,697
Patented June 2, 1970

3,515,697
PRODUCTION OF MELAMINE-ACETOGUAN-AMINE-TOLUENESULFONAMIDE COPOLY-CONDENSATE RESINS
Teruo Miwa, Higashi Osaka, Zenzaburo Shibata, Osaka, Hiroaki Araki, Osaka Prefecture, Tadamoto Tanaka, Hirakata, and Hiroshi Sakaguchi, Nara, Japan, assignors to Matsushita Electric Works, Ltd., Kodoma, Japan
Filed May 29, 1967, Ser. No. 641,790
Claims priority, application Japan, June 3, 1966, 41/36,039
Int. Cl. C08g 9/28, 9/30, 37/30
U.S. Cl. 260—67.6                                   1 Claim

ABSTRACT OF THE DISCLOSURE

A method of producing a thermosetting melamine-acetoguanamine-toluenesulfonamide condensate resin which comprises condensing a methylolmelamine having 2-5 methylol groups per melamine molecule with acetoguanamine and toluene-sulfonamide in such a proportion that the total of the acetoguanamine and toluenesulfonamide is 0.2-1.5 mol per mol of the methylolmelamine and the toluenesulfonamide is 0.3-2.5 mols per mol of the acetoguanamine.

---

This invention relates to a novel thermosetting resin and to the production of such resin. More particularly, this invention relates to a thermosetting melamine-acetoguanamine-toluenesulfonamide resinous condensate and to a method of producing such resin.

Melamine-formaldehyde resins generally possess various excellent properties and have widely been used in the molding, laminating, adhesive and point-making fields. More particularly, these thermosetting or heat-curable resins possess, in the cured or thermoset state, excellent hardness, resistance to chemicals, resistance to heat and excellent electric property.

However, conventional melamine-formaldehyde resins have various drawbacks. Thus, for example, a solution of a known thermosetting melamine-formaldehyde resin is very poor in stability. When such resin varnish is allowed to stand, the resin will be crystallized out or there will occur phase separation within only a few hours. Further, such melamine-formaldehyde resin in a cured or thermoset state is rather brittle and is not satisfactory in the reformability (remoldability) and in the resistance to cracking. Further, a conventional thermosetting melamine-formaldehyde resin has no satisfactory flowability at an elevated temperature over a wide range so that its molding is not easy.

There have been proposed various methods to overcome these drawbacks by chemically or physically modifying the resins. However, any of these proposals has been able to overcome only one or some of these drawbacks but not all.

Therefore, it is a principal object of this invention to provide a novel melamine type resin with improved properties.

It is another object to overcome all the above mentioned drawbacks of conventional melamine type resins.

Figure 2:
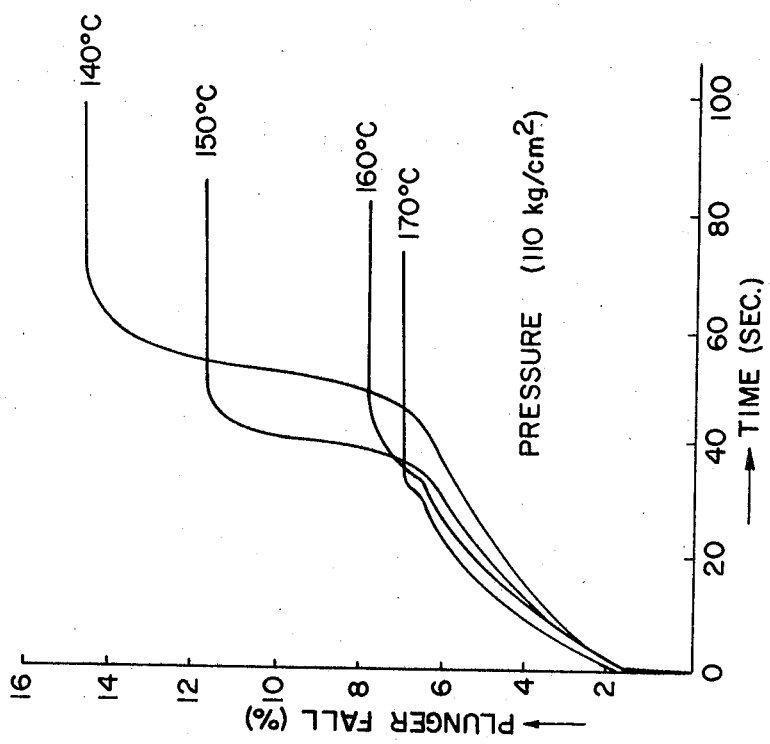
Figure 1:
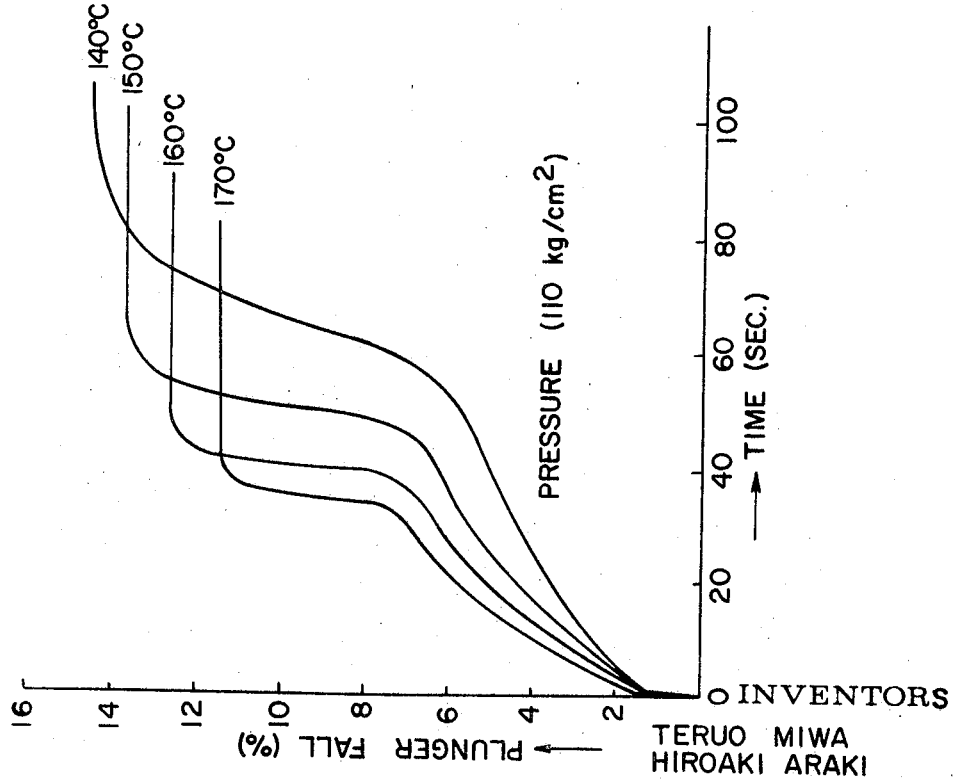

Other objects of the invention will be apparent from the following description which will be made partly by referring to the accompanying drawings wherein:

FIG. 1 is a graph showing flowability of a molding material of melamine-acetoguanamine-toluenesulfonamide of this invention, and FIG. 2 is a graph similar to FIG. 1 but showing flowability of conventional melamine-formaldehyde thermosetting resin.

Briefly, the novel thermosetting resin of this invention is prepared by condensing a methylolmelamine having 2-5 methylol groups with acetoguanamine and toluenesulfonamide in such a proportion that the total of the acetoguanamine and toluenesulfonamide is 0.2-1.5 mol per mol of the methylolmelamine and the toluenesulfonamide is 0.3-2.5 mols per mol of the acetoguanamine.

The methylolmelamines to be used in this invention are commercially available. If desired, they may be prepared by methods which are so well known is the art that it will be not necessary to explain in great detail herein. In general, these conventional methods involve reacting melamine with an aldehyde (e.g. formaldehyde, paraformaldehyde, trioxane, acetaldehyde, etc.) in an amount of 2-5 mols per mol of melamine at a pH of 8-12 in a suitable solvent. It is most preferable to employ formaldehyde or formaline as aldehyde. Examples of suitable solvent are water; lower aliphatic alcohols such as methyl alcohol, ethyl alcohol, n-propyl alcohol, iso-propyl alcohol, n-butyl alcohol, iso-butyl alcohol, sec-butyl alcohol, tert-butyl alcohol, etc.; ketones such as acetone, methyl ethyl ketone, methyl-n-propyl ketone, methyl isopropyl ketone, methyl n-butyl ketone, methyl isobutyl ketone, diethyl ketone, di-n-propyl ketone, etc.; and a mixture of any two or more of them. The pH may be adjusted by any proper alkaline substance such as sodium hydroxide, potassium hydroxide, magnesium hydroxide, calcium hydroxide, sodium carbonate, sodium hydrogen carbonate, ammonium hydroxide, etc. The solid content in the reaction system may be 10-80%, preferably 40-70% by weight. The reaction temperature is not critical and may vary over a wide range such as from room temperature (about 20° C.) to 120° C., although a temperature of from 50 to 100° C. is preferable. The reaction time should be sufficient (e.g. about 30-180 minutes) to complete the desired methylolation of melamine. The resulting product is a mixture of various methylolmelamines which may range from monomethylolmelamine to hexamethylolmelamine. Therefore, the term "methylolmelamine" as used in this specification and claims also means a mixture of these various methylolmelamine. However, according to this invention, the number of methylol groups per mol of melamine must be 2-5 in average. If the number of methylol groups is less than 2 per melamine molecule the resulting resin would not be able to be cured to a satisfactory extent, while if the number of methylol groups is higher than 5 the resulting resin will be excessively cross-linked so that moldability over a wide range of temperatures can not be obtained.

The important feature of this invention is to condense such melamine having 2-5 methylol groups with acetoguanamine and toluenesulfonamide (p-, o- or a mixture of p- and o-toluenesulfonamide). The total amount of the acetoguanamine and toluenesulfonamide must be 0.2-1.5 mol per mol of the melamine. If the total amount is less than 0.2 mol per mol of the melamine the resulting resin will become brittle, poor in reformability or trimmability and narrow in allowance for moulding temperature and time, while if the total amount is higher than 1.5 mol per mol of the melamine, the resulting thermosetting resin solution will become poor in stability. The most preferable total amount of acetoguanamine and toluenesulfonamide is 0.4-0.8 mol per mol of the melamine.

Further, the proportion of acetoguanamine and toluenesulfonamide should be such that toluenesulfonamide is 0.3-2.5 mols per mol of acetoguanamine. If the amount of toluenesulfonamide per mol of acetoguanamine is outside the mentioned range, it would become difficult to obtain a stable solution of thermosetting resin.

The condensation reaction is conducted in a suitable solvent. The solvents may be same as those enumerated before in connection with the methylolation of melamine.

The condensation reaction should be carried out at a pH of from 5 to 11, most preferably from 7 to 10. If the pH is lower than 5 the methylolmelamines tend to react with each other to cause methylenation and gelling before the reaction with acetoguanamine and toluenesulfonamide satisfactorily process. If the pH is higher than 11, the condensation reaction will proceed too slow to be practical.

Usually, no special procedure to adjust the pH of the reaction system is required because the system consisting of the methylolmelamine, acetoguanamine, toluenesulfonamide and a solvent would usually show a pH within the range mentioned. If necessary, however, the pH may be adjusted by the addition of usual alkaline or acidic substance. As for alkaline substances, those mentioned before in connection with the methylolation of melamine may be used. Examples of useful acidic substances are organic acids such as oxalic acid, acetic acid, lactic acid, phthalic acid, maleic acid, phthalic anhydride, fumaric acid, maleic anhydride, etc. and inorganic acids such as hydrochloric acid, sulfuric acid, nitric acid.

The solvent may be selected from water, lower aliphatic alcohols and ketones, particular examples of which have been mentioned before in connection with the methylolation of melamine.

The solid content in the reaction mixture may be such that the methylolmelamine would present in a concentration of 10–80%, preferably 40–70% by weight.

The reaction temperature may vary over a wide range, e.g. from room temperature (about 20° C.) to 120° C., although a temperature of from 50–100° C. is preferred. Usually, the reaction is completed within about 30–120 minutes.

In this way, a solution of a thermosetting melamine-acetoguanamine-toluenesulfonamide precondensate having an average molecular weight of about 250–600 is obtained.

The resulting thermosetting or heat-curable melamine-acetoguanamine-toluenesulfonamide resinous condensate is soluble in various solvents mentioned before, particularly in water, and its solution is very stable. For example, an aqueous solution of the resin is stable for a month or more at room or ordinary temperature.

The thermosetting resin solution obtained by the method of this invention may be used in the usual manner in the usual applications well known in the art of thermosetting melamine-formaldehyde resins. Thus, for example, the resin solution may be used as such, with or without the further addition of water or organic solvent, or the solvent used in preparing the condensate may be evaporated and the resulting dry product may then be pulverized to a fine power which is useful in molding.

If desired, an acidic or potentially acidic curing catalyst which is well known in the art may be incorporated into the composition to facilitate the cure. Preferable curing catalysts include ammonium salts of strong acids such as ammonium chloride, ammonium sulfate, ammonium imidosulfonate; organic acids such as oxalic acid, citric acid, phthalic anhydride, dimethyl oxalic acid, etc. The amount of the catalyst may vary depending upon the particular catalyst and also upon the particular application of the resin. In general, however, these catalysts may be employed in amounts ranging from about 0.05 to about 2% by weight based on the resin.

The most typical uses of the thermosetting melamine-acetoguanamine-toluenesulfonamide of this invention are in the molding and laminating fields. The various processes for the preparation of molded and laminated articles by the use of melamine resins are so well known in the art that no greater mention than the following general description will be necessary here.

Thus, for example, in order to prepare thermosetting resinous molding materials, the resin solution (solid content 10–80%, preferably 40–60% by weight) is mixed with a fibrous filler such as chopped pulp, asbestos, wood flour, etc. in an amount of about 35–60 parts by weight per 100 parts of the resin for impregnation and also with 0.2–1 part by weight of a lubricant such as zinc stearate, cadmium stearate, aluminium stearate, etc. The mixture is well blended and then dried to a low volatile content (10% or less). The dried material is pulverized to a fine powder while blending it with various commonly employed additives such as curing catalyst, pigment, etc. The resulting molding powder can be molded into articles by usual molding techniques.

For lamination purpose, a resin solution of a viscosity of 100±50 cps. is generally used. Therefore, if necessary, the solution of a thermosetting resin directly resulting from the method of this invention may be diluted with a solvent mentioned hereinbefore. Then a catalyst is added to control the gelling time of the resin. The gelling time may be determined by measuring the time required for the solution to attain a viscosity of 200 poises at 135° C. It is preferable that the catalyst and amount be selected so that the gelling time will be about 20 minutes. A web material, e.g. α-cellulose paper, cellulosic fabrics, synthetic fiber fabrics, and the like is impregnated with the resin solution by any suitable means such as by a coater provided with a dip roll or squeeze roll. The impregnated web material may contain about 30–80% by weight of the impregnated resin. The web material may be colored or imprinted to provide a decorative effect. A plurality of these resin-impregnated sheets are assembled together with or without a core which may comprise a plurality of sheets impregnated with a conventional phenolic resin. The assembly is then placed in a molding press and molded under heat and pressure to prepare a final laminated article. The molding conditions may be varied over a wide range, but in general a pressure of 60–120 kg./cm.$^2$ and a temperature of 140–180° C. are preferable and the time required is about 2 hours.

The thermosetting resins and thermoset resins of this invention have various excellent properties. For example, a solution of the thermosetting resin is stable for a prolonged period of time and no resin precipitation or phase separation is seen even after one month or more. The thermosetting resin of this invention shows satisfactory flowability over a wide range of temperatures. This means that the thermosetting resin of this invention can be formed or molded at a temperature within a wide range. The resin of this invention as molded and heat-cured is excellent in surface glaze and reformability (bendability).

The present invention will be further described with reference to the following examples. All parts and percentages are by weight, unless otherwise stated.

EXAMPLE 1

126 parts (1 mol) of melamine, 210.6 parts (2.6 mols as formaldehyde) of 37% formaline, 0.3 part of sodium carbonate and 30 parts of water were charged into a reactor provided with a stirrer and a reflux condenser. The mixture was allowed to react at a temperature of 70° C. for 60 minutes. The pH of this reaction mixture was 10.4 (AZY). The reaction product was analyzed and found to be a melamine formaldehyde condensate (consisting mainly of methylol melamine) and in which substantially no methylene ether bond and dimethylene ether bond were present. Then, 50 parts (0.4 mol) of acetoguanamin and 51.3 parts (0.3 mol) of p-toluenesulfonamide were added to said reaction product in the form of a solution and the mixture was allowed to react at a reflux temperature for 90 minutes. The pH of the reaction mixture at this time was 8.2 to 8.4.

The thus obtained resin varnish was so stable for more than 1 month.

On the other hand, a solution of a melamine formaldehyde resin obtained by reacting 126 parts of melamine, 162 parts of 37% formalin, 0.6 part of sodium carbonate and 30 parts of water at 80° C. for 120 minutes, a solution of a melamine acetoguanamine condensate resin obtained by reacting 0.3 mol of acetoguanamine and 1 mol of melamine in the same manner as mentioned above, and a solution of a melamine p-toluenesulfonamide condensate resin obtained by reacting 0.3 mol of p-toluenesulfonamide with 1 mol of melamine in the same manner as mentioned above were all separated into two layers in about 3 hours to 1 day.

EXAMPLE 2

A mixture of 126 parts (1 mol) of melamine and 202.5 parts (2.5 mols as formaldehyde) of 37% formaline was allowed to react at 70° C. for 60 minutes in a reaction vessel fitted with a stirrer and a reflux condenser. The pH of the reaction mixture was adjusted to 10.4 with sodium carbonate. After the reaction, 37.5 parts (0.3 mol) of acetoguanamine and 34.2 parts (0.2 mol) of p-toluenesulfonamide were added and the mixture was allowed to react at a reflux temperature for 120 minutes. The pH of the reaction solution at this time was 8.2 to 8.4.

The thus obtained resin varnish was stable for more than 1 month.

The melamine acetoguanamine-p-toluene sulfonamide resin varnish prepared above and having a resin concentration of 53.4% was adjusted to pH 6.2 with oxalic acid. 1000 parts of this resin varnish and 220 parts of pulp were mixed in a kneader and were then dried in a hot air dryer at 80° C. then, 0.3% zinc stearate was added to this dried product. The product was pulverized by a crusher to prepare a molding material. When the flow curves of the thus obtained molding material and a commercial melamine formaldehyde molding material at 140, 150, 160 and 170° C. were measured with a flow tester (Model 301 manufactured by K. K. Shimadzu Seisakusho, Kyoto, Japan), the results shown in FIGS. 1 and 2 were obtained.

As shown in these two diagrams, the flow curve of the molding material made in this example showed substantially the same fluidity as of the melamine-formaldehyde resin at 140° C. But, with the rise of the temperature, the melamine-formaldehyde resin did not substantially flow at 160° C. The flowability represented by the fall of the plunger was greatly different between at 140 and 160° C.

On the other hand, the flowability the molding material of this invention was little different at 140 and 170° C. This means that the molding material of this invention is not unduly sensitive to temperature variation and can be molded at a temperature over a wide range.

EXAMPLE 3

A reaction vessel fitted with an agitator and refluxing condenser was charged with 216 parts (1 mol) of commercial trimethylolmelamine, 50 parts (0.4 mol) of acetoguanamine, 34.2 parts (0.2 mol) of o-toluenesulfonamide, 100 parts of isobutyl alcohol and 200 parts of water. The pH of the mixture was adjusted to 8.2–8.4. The mixture was allowed to react at 90° C. for 150 minutes to obtain a solution of melamine-acetoguanamin-o-toluenesulfonamide resinous condensate. The solution was stable for a long period of time and no change was observed even after one month.

EXAMPLE 4

A reaction vessel fitted with an agitator, refluxing condenser and thermometer was charged with 126 parts (1 mol) of melamine, 246 parts (3.0 mol as formaldehyde) of 37% formaline, 0.5 part of sodium carbonate and 30 parts of water. The mixture (pH 10.8) was allowed to react at 95° C. for 60 minutes. To the methylolation reaction product were added 62.5 parts (0.5 mol) of acetoguanamine and 85.6 parts (0.5 mol) of p-toluene sulfonamide and the pH of the mixture was adjusted to 8.0–8.2 by adding sodium hydroxide. The mixture was allowed to react at 80° C. for 120 minutes to obtain a resin varnish, which was stable for two weeks or more. This varnish or solution is referred to as Resin Syrup A.

For comparison, a thermosetting melamine-formaldehyde resin solution (referred to as Resin Syrup B) was prepared by reacting a mixture of 126 parts of melamine, 162 parts of 37% formaline, 0.6 part of sodium carbonate and 30 parts of water at 100° C. for 120 minutes. Under the same conditions two further resin solutions were prepared respectively by reacting one mol of melamine and 0.5 mol of acetoguanamine to obtain a solution of thermosetting melamine-acetoguanamine condensate (referred to as Resin Syrup C) and by reacting 1 mol of melamine with 0.5 mol of p-toluenesulfonamide to obtain a solution of thermosetting melamine-p-toluenesulfonamide condensate (referred to as Resin Syrup D).

Each of these Resin Syrups was adjusted to pH 6.2 with oxalic acid and diluted to a viscosity of 100–150 cps. (at 25° C.) with a methanol-water mixture (1:1). A paper sheet (40 g./m.$^2$) for the surface layer and printed paper sheet (140 g./m.$^2$) were impregnated with the above prepared resin varnishes to prepare the following resin-impregnated sheets:

|  | Surface Sheet, Percent | | Printed Sheet, Percent | |
| --- | --- | --- | --- | --- |
|  | Volatile | Resin | Volatile | Resin |
| Resin Syrup A | 8 | 65 | 8 | 40 |
| Resin Syrup B | 8 | 68 | 8 | 40 |
| Resin Syrup C | 7 | 65 | 7 | 40 |
| Resin Syrup D | 8 | 70 | 8 | 40 |

A kraft paper (190 g./m.$^2$) was impregnated with a solution of a phenolic resin. The resulting resin-impregnated kraft paper contained 8% volatile and 40% resin. This impregnated kraft paper was used as a core sheet.

One surface sheet, one printed sheet and five core sheets as above prepared were laminated together in the order stated and the laminated assembly was placed between a pair of coal plates and heated for 30 minutes at various temperatures under a pressure of 80 kg./cm.$^2$ to obtain a cured laminate. The surface glaze and formability of the resulting laminates are shown in the following table.

| | Molding temp. (° C.) | Surface glaze | Formability* |
| --- | --- | --- | --- |
| (A) | 130 | Excellent | 10 R, OK |
| | 140 | do | |
| | 150 | do | 19 R, OK |
| | 160 | do | |
| (B) | 130 | Not moldable | |
| | 140 | | |
| | 150 | Bad | 19 R, OK |
| | 160 | | |
| (C) | 130 | Not moldable | |
| | 140 | | 10 R, OK |
| | 150 | Bad | |
| | 160 | | |
| (D) | 130 | Not moldable | |
| | 140 | | 19 R, Failed |
| | 150 | Good | |
| | 160 | | |

*NEMA Standard 1D 1-2.11, "Method of Determining Formability" (Bend Test).

NOTE.—In the table, the number before "R" indicates the radius.

What we claim is:

1. A method of producing a thermosetting melamine-acetoguanamine - toluenesulfonamide condensate resin which consists essentially of condensing in a solvent for the reactants and resulting resin at a pH of from 5 to 11 and at a temperature of from 20° C. to 120° C., a methylolmelamine having 2 to 5 methyloyl groups per melamine molecule with acetoguanamine and toluenesulfonamide in such a proportion that the total of the acetoguanamine and toluenesulfonamide is 0.2 to 1.5 mols per mol of the methylolamine and the toluenesulfonamide is 0.3 to 2.5 mols per mol of the acetoguanamine.

References Cited

UNITED STATES PATENTS 3,303,168   2/1967   Kazenas _____ 260—67.6

HAROLD D. ANDERSON, Primary Examiner

R. J. KOCH, Assistant Examiner

U.S. Cl. X.R.

260—849, 29.4; 161—257, 259